(12) United States Patent
Ueno

(10) Patent No.: US 7,054,246 B2
(45) Date of Patent: May 30, 2006

(54) OPTICAL DISK DEVICE ADAPTED FOR RELIABLY DETECTING PRE-PIT INFORMATION FORMED ON AN OPTICAL DISK

(75) Inventor: Keishi Ueno, Iruma (JP)

(73) Assignee: TEAC Corporation, Musashino (JP)

( * ) Notice: Subject to any disclaimer, the term of this patent is extended or adjusted under 35 U.S.C. 154(b) by 339 days.

(21) Appl. No.: 10/251,474

(22) Filed: Sep. 19, 2002

(65) Prior Publication Data

US 2003/0058764 A1 Mar. 27, 2003

(30) Foreign Application Priority Data

Sep. 21, 2001 (JP) .............................. 2001-288304
Sep. 25, 2001 (JP) .............................. 2001-292578

(51) Int. Cl.
G11B 7/45 (2006.01)

(52) U.S. Cl. ................................. 369/47.27; 369/47.17
(58) Field of Classification Search ............. 369/47.17, 369/47.27, 47.47, 47.31, 44.41, 44.29
See application file for complete search history.

(56) References Cited

U.S. PATENT DOCUMENTS

| 6,181,657 | B1 |   | 1/2001  | Kuroda et al. |         |
|-----------|----|---|---------|---------------|---------|
| 6,337,838 | B1 | * | 1/2002  | Hikima et al. | 369/53.31 |
| 6,487,149 | B1 |   | 11/2002 | Yokoi et al.  |         |
| 6,556,523 | B1 |   | 4/2003  | Masui         |         |
| 6,603,726 | B1 | * | 8/2003  | Yoshida et al.| 369/124.01 |
| 6,754,157 | B1 | * | 6/2004  | Osada         | 369/53.28 |
| 6,891,784 | B1 | * | 5/2005  | Yanagawa et al.| 369/47.22 |
| 2001/0028613 | A1 | * | 10/2001 | Okamoto et al.| 369/44.25 |
| 2002/0114261 | A1 | * | 8/2002  | Yanagawa et al.| 369/124.12 |

FOREIGN PATENT DOCUMENTS

| JP | 02-166622    | 6/1990  |
| JP | 08-235593    | 9/1996  |
| JP | 9-17029      | 1/1997  |
| JP | 09-128758    | 5/1997  |
| JP | 10-283730    | 10/1998 |
| JP | 2000-149259  | 5/2000  |
| JP | 2000-260025 A| 9/2000  |
| JP | 2000-285455  | 10/2000 |
| JP | 2002-85455   | 10/2000 |
| JP | 2000311344   | 11/2000 |
| JP | 2001-093147  | 4/2001  |
| JP | 2001-167447  | 6/2001  |
| JP | 2001-236650  | 8/2001  |

* cited by examiner

*Primary Examiner*—Brian E. Miller
*Assistant Examiner*—Michael V. Battaglia
(74) *Attorney, Agent, or Firm*—Christensen O'Connor Johnson Kindness PLLC

(57) ABSTRACT

An optical disk device which performs data recording and reproduction with regard to an optical disk on which pre-pit information for specifying an address is formed. An optical disk is irradiated with a laser beam and return light from the optical disk is detected by two photodetectors which are disposed in the radial direction. After the levels of two signals from the photodetectors are limited, a difference between these signals is calculated. Due to the limitation of the levels, noise during the recording power period is removed so that pre-pit information during the reproducing power period, namely during the space period, is extracted. Further, by calculating a difference between the two signals from the photodetectors, pre-pit information during the recording power period is extracted. It is also possible for a laser beam to be split into a main laser beam and a sub laser beam, and the sub laser beam is irradiated onto a track on which a pre-pit is formed and the pre-pit information is extracted from a signal of return light from the sub laser beam.

9 Claims, 13 Drawing Sheets

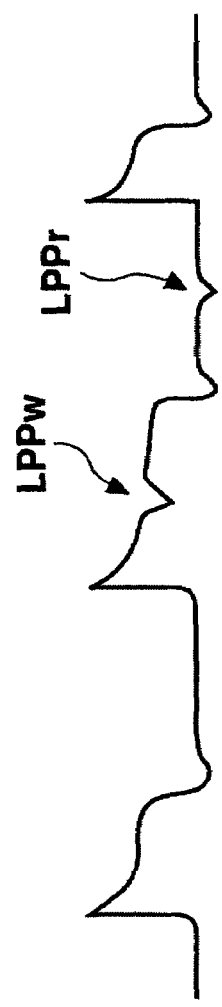
Fig. 7A  A+D
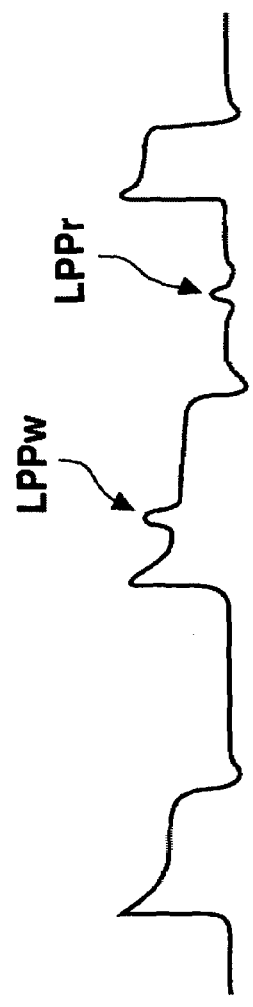
Fig. 7B  B+C
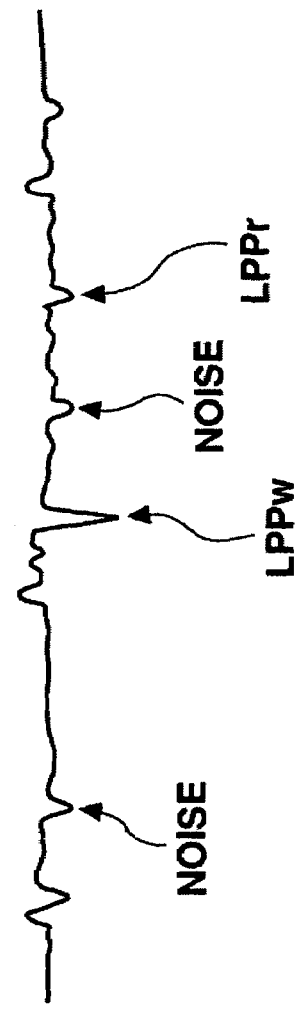
Fig. 7C  (A+D) − (B+C)

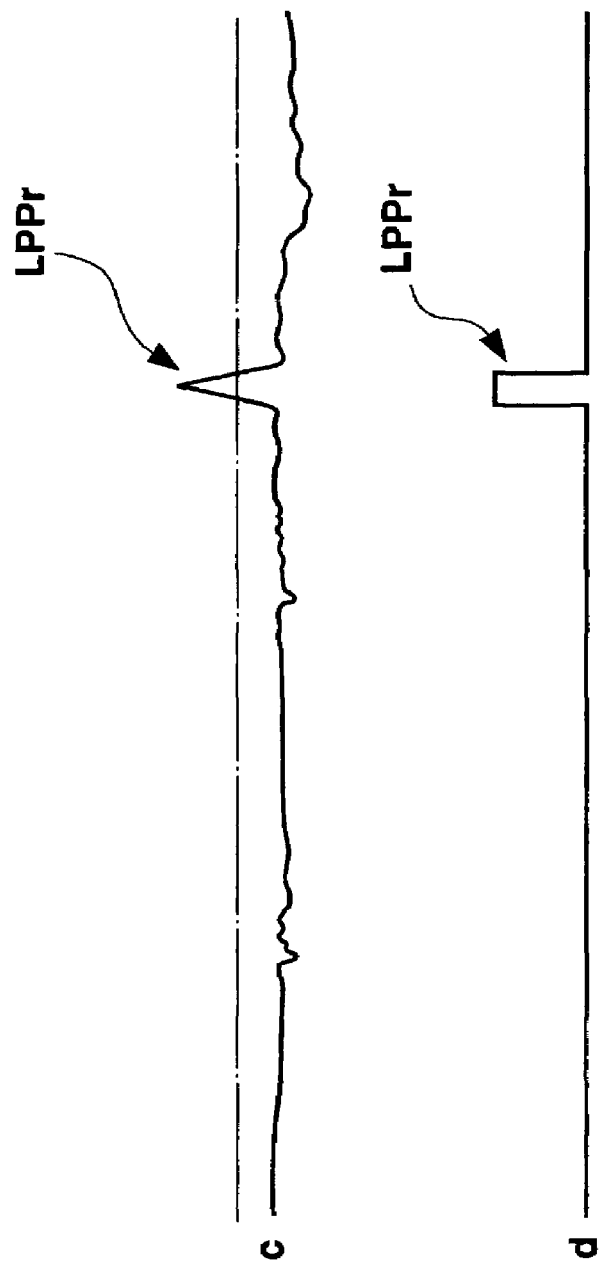

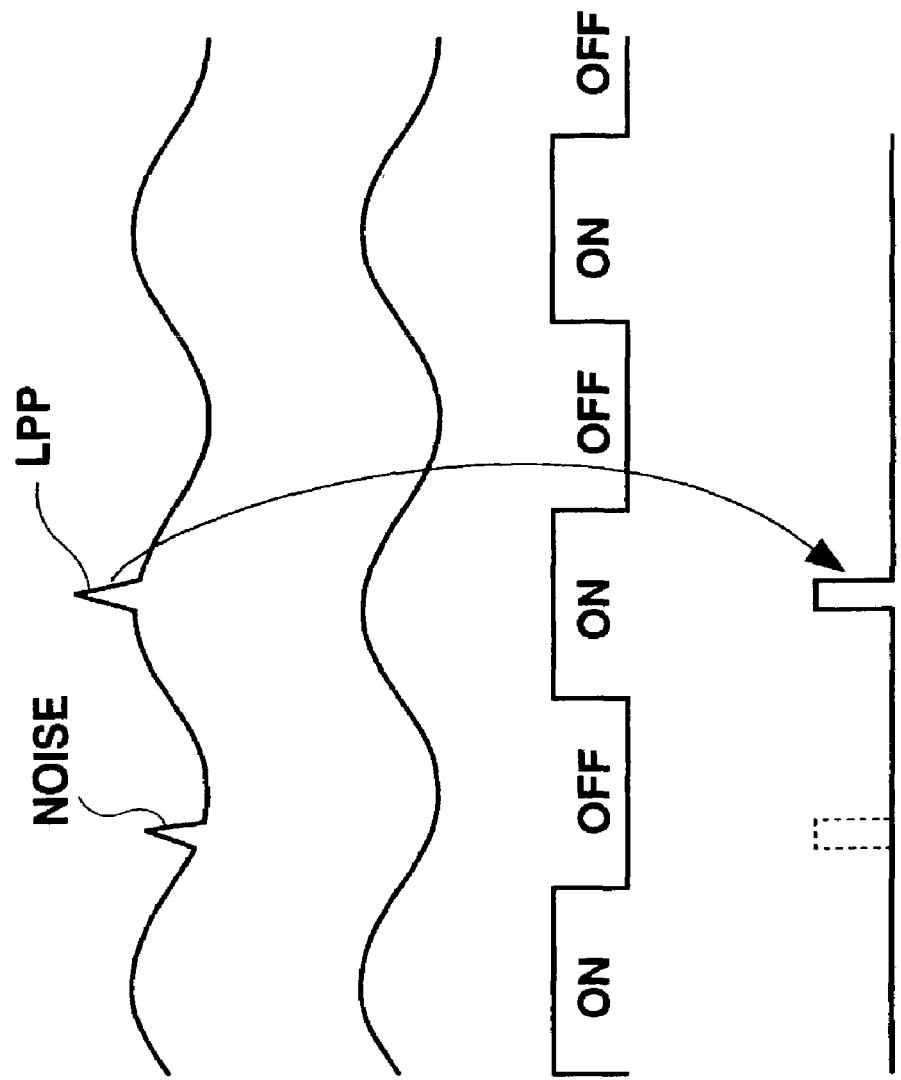

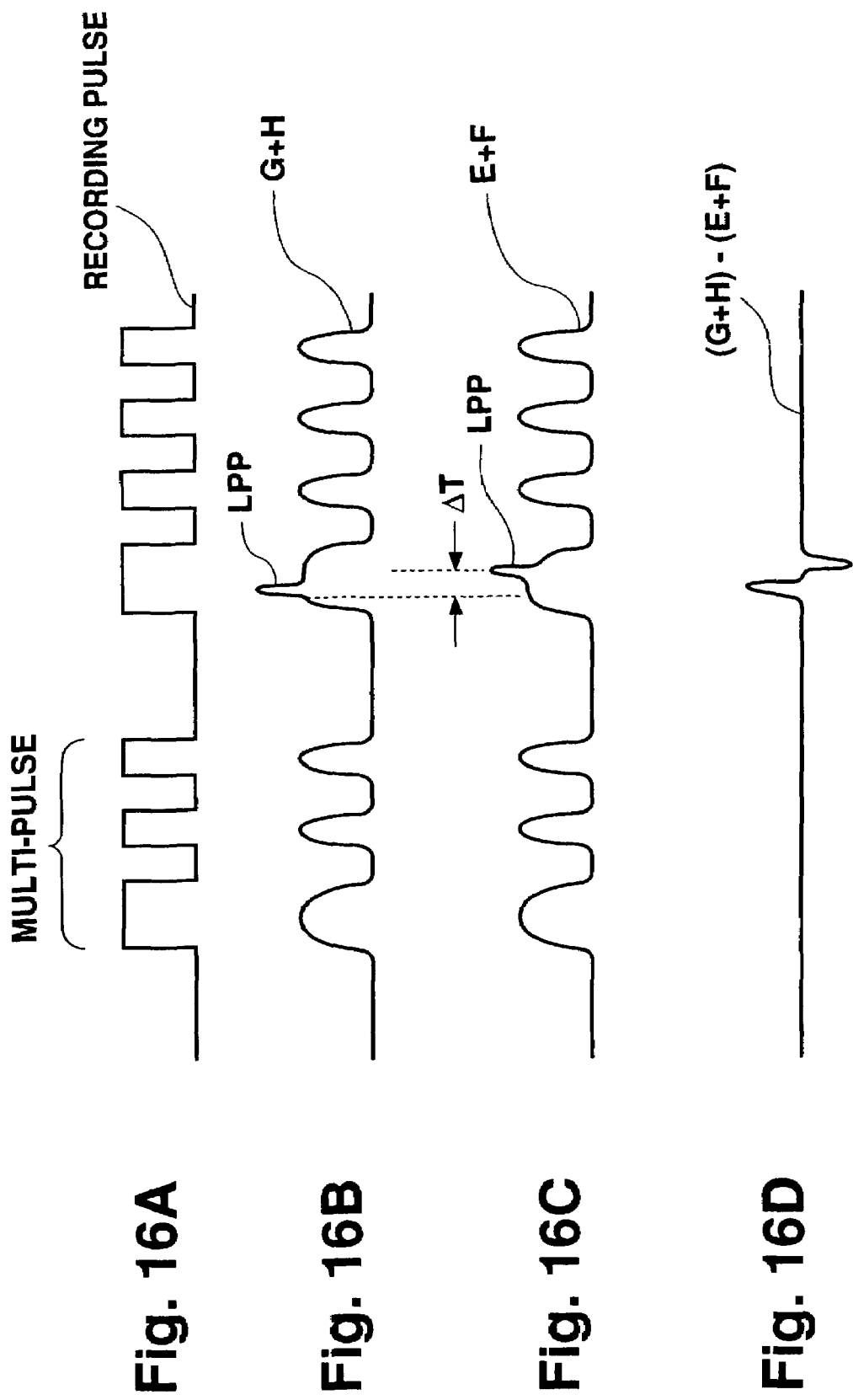

OPTICAL DISK DEVICE ADAPTED FOR RELIABLY DETECTING PRE-PIT INFORMATION FORMED ON AN OPTICAL DISK

BACKGROUND OF THE INVENTION

1. Field of the Invention

The present invention relates to an optical disk device, and more particularly to a technique for detecting a pre-pit formed on an optical disk.

2. Description of Related Art

In optical disks such as DVD-R, DVD-RW or the like, a pre-pit having address information regarding an information recording track is formed in a track adjacent to the information recording track, for example, in a land adjacent to a groove on the outer peripheral side. When recording and reproducing data, the address of the optical disk is specified by detection of the pre-pit.

Typically, a pre-pit is detected in the following manner. Specifically, a laser beam is irradiated toward the center of the information recording track and the return light therefrom is converted into an electrical signal by four segment photodetectors which are disposed in the radial and circumferential directions. Then, a difference between two signals obtained from two photodetectors which are disposed apart from each other in the radial direction is calculated. As a result of this difference calculation, a modulation component of recording power is removed, so that a pre-pit signal contained in the difference signal is extracted and decoded.

However, when a difference between two signals output from the two photodetectors which are disposed apart from each other in a radially divided manner as described above, it is not possible to completely remove a modulation component of recording power, leaving such a modulation component unremoved as noise, especially at edge portions immediately after start and completion of recording. In addition, since the laser power is greater in recording than in reproducing and an amount of return light is also increased in the recording power, the noise level for recording power can be increased to a level equal to or greater than the pre-pit level of the reproducing power. In such a case, it is not possible to distinguish noise of the recording power from a pre-pit signal of reproducing power with regard to their levels, which makes it difficult to extract the pre-pit signal of the reproducing power when the difference signal is binarized with a predetermined threshold value so as to extract the pre-pit signal. Namely, if the threshold value is increased to remove the noise of recording power, the pre-pit signal of the reproducing power is also removed. If the threshold is decreased to extract the pre-pit signal of the reproducing power, on the other hand, the noise in the recording power is also extracted erroneously as a pre-pit signal. Since the period for applying the recording power corresponds to a mark period whereas the period for applying the reproducing power corresponds to a space period, the foregoing problem can be regarded as a problem that it is difficult to extract a pre-pit signal during the space period.

While it is possible to overcome the foregoing problem using the structure as disclosed in Japanese Patent Laid-Open Publication No. 2000-311344, in which a circuit for detecting a pre-pit during a mark period and a circuit for detecting a pre-pit during a space period are provided in parallel, so that pre-pits are detected in the mark and space periods, respectively, this structure also has a problem. Specifically, this structure requires a circuit for generating a gate signal used for processing a signal in each of the mark and space periods, which makes the circuit configuration complicated.

SUMMARY OF THE INVENTION

An object of the present invention is to provide an optical disk device capable of recording and reproducing data by reliably detecting pre-pit information formed on an optical disk.

An optical disk device according to one aspect of the present invention comprises irradiation means for irradiating a laser beam onto an optical disk, detection means which is divided into at least two segments in the radial direction of the optical disk for detecting return light from the optical disk, adjustment means for performing adjustment such that levels of two signals supplied from the detection means match, limitation means for limiting the level of each of two signals supplied from the adjustment means, calculation means for calculating a difference between two signals supplied from the limitation means, and extraction means for extracting the pre-pit information contained in a signal output from the calculation means.

According to another aspect of the present invention, the irradiation means irradiates a laser beam of recording power and a laser beam of reproducing power or erasing power when recording data, and the limitation level of the limitation means is set to be smaller than the level of return light when a laser beam of recording power is irradiated and to be greater than the level of return light when a laser beam of reproducing power is irradiated.

According to another embodiment of the present invention, an optical disk device further comprises second calculation means for calculating a difference between two signals supplied from the adjustment means, and second extraction means for extracting the pre-pit information contained in a signal from the second calculation means. The pre-pit information when laser beam of reproducing power is irradiated, namely during the space period when recoding data is extracted by the extraction means, and the pre-pit information when a laser beam of recording power is irradiated, namely during the mark period when recording data is extracted by the second extraction means. By synthesizing the pre-pit information during the mark period and the pre-pit information during the space period or calculating a logical sum of the pre-pit information during both periods, the pre-pit information during the both the mark and space periods when recording data can be extracted.

Further, an optical disk device according to another aspect of the present invention comprises irradiation means for irradiating a main laser beam onto an information recording track and for irradiating a sub laser beam onto a track on which pre-pit information regarding the information recording track is formed, detection means for detecting return light of the sub laser beam from the optical disk, and extraction means for extracting the pre-pit information from a signal supplied from the detection means.

According to still another aspect of the present invention, the detection means includes at least two photodetctors which are disposed in the circumferential direction of the optical disk, and the extraction means includes calculation means for selectively calculating a sum of or a difference between two signals supplied from the photodetectors, and means for slicing the peak of a signal supplied from the calculation means at a predetermined level. The extraction means may include adjustment means for performing adjustment such that levels of two signals supplied from the photodetectors match, calculation means for calculating a difference between two signals supplied from the adjustment means, and means for slicing the peak of a signal from the calculation means at a predetermined level.

According to another embodiment of the present invention, the photodetectors are four segment photodetectors which are disposed in each of the radial and circumferential directions, and the extraction means further includes wobble signal extraction means for extracting a wobble signal of the information recording track based on a signal supplied from photodetectors which are disposed in the radial direction, and means for setting a process window based on the wobble signal. The extraction means outputs only a signal within the process window. This structure focuses on the fact that the pre-pit information is formed in synchronization with the wobble signal, and noise other than the pre-pit information can be removed by setting a process window based on the detected wobble signal.

The present invention is applicable to a drive for performing data recording and reproduction with regard to an optical disk on which the pre-pit information is formed in advance, such as DVD-R and DVD-RW.

The present invention will be understood more clearly with reference to the embodiments described below. The scope of the present invention is not, however, limited to the following embodiments.

BRIEF DESCRIPTION OF THE DRAWINGS

These and other objects of the invention will be explained in the description below, in connection with the accompanying drawings, in which:

FIGS. 7A, 7B, and 7C are timing charts showing a signal (A+D), a signal (B+C), and a signal (A+D)−(B+C), respectively;

FIGS. 9A and 9B are timing charts showing signals output from a differential amplifier 26i and a binarizer 26j of FIG. 5, respectively;

FIGS. 15A, 15B, 15C, and 15D are timing charts showing a signal (E+F)+(G+H), a signal (F+G), a signal output from a slicer 27m of FIG. 13, and a signal output from a gate circuit 27f of FIG. 13, respectively; and FIGS. 16A, 16B, 16C, and 16D are timing charts showing a waveform of a recording pulse, a signal (G+H), a signal (E+F), a signal (G+H)−(E+F), respectively.

DETAILED DESCRIPTION OF PREFERRED EMBODIMENTS

Preferred embodiments of the present invention, in which a DVD-R is used as an example of an optical disk, will be described with reference to the accompanying drawings.

Figure 1:
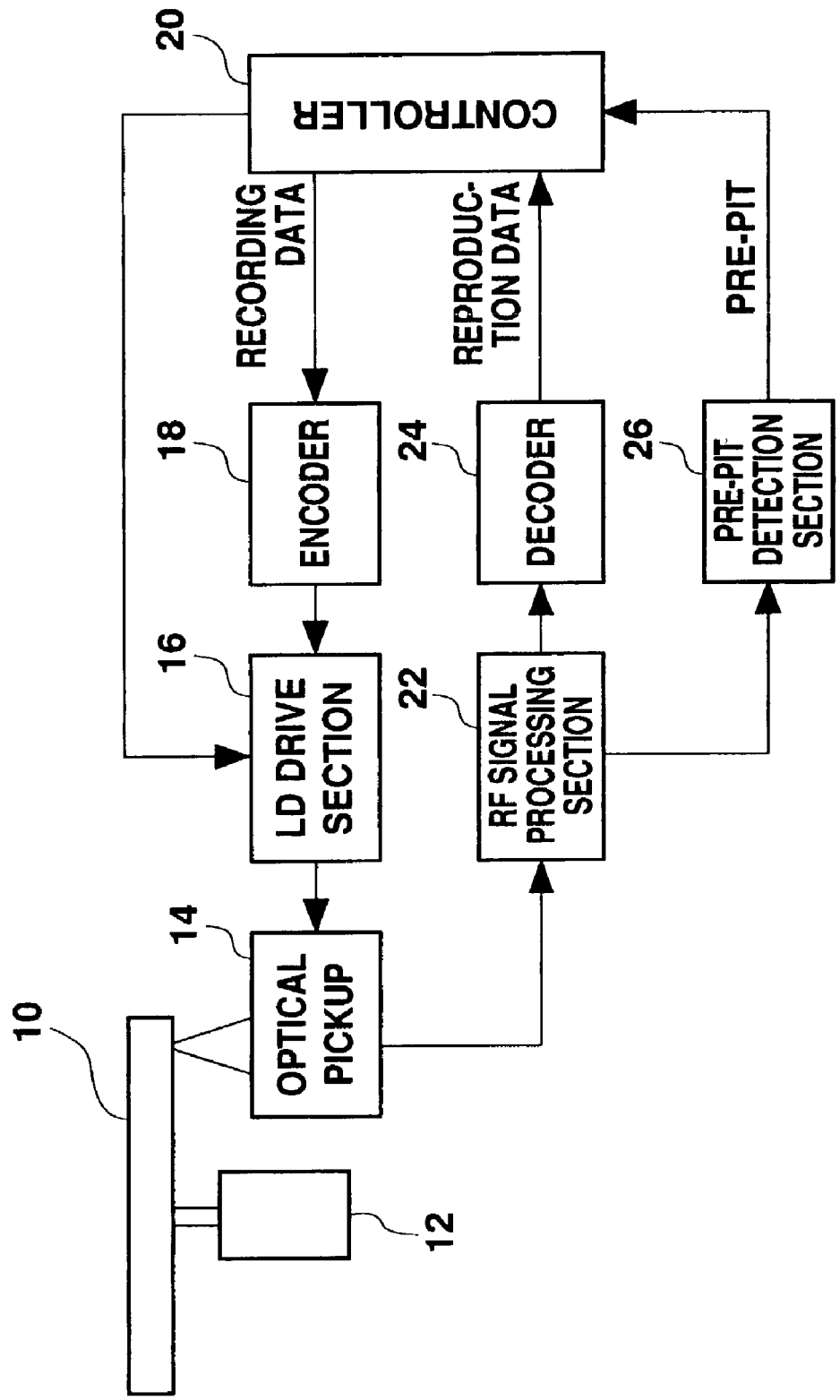
FIG. 1 is a block diagram showing a configuration of an optical disk device.

FIG. 1 is a block diagram showing a configuration of an optical disk device according to an embodiment. An optical disk (DVD-R) 10 is rotationally driven at a CAV (or a CLV) by a spindle motor 12. In the areas (called lands) between grooves which are information recording tracks of the optical disk 10, pre-pits (Land Pre-Pits: LPP) are formed at predetermined intervals. The address of the optical disk 10 can be specified by detecting these pre-pits.

An optical pickup 14, which is disposed so as to face the optical disk 10, irradiates a laser beam of recording power onto the optical disk 10 so as to record data, and also irradiates a laser beam of reproducing power so as to reproduce the recorded data. When recording, recording data supplied from a controller 20 is modulated in an encoder 18, and the modulated signal is then converted into a drive signal at an LD drive section 16 for driving a laser diode (LD) provided in the optical pickup 14. More specifically, during the mark period in which a pit is formed, recording is performed with a single pulse for 3T data and with a plurality of pulses (a multi-pulse or a pulse train) for 4T to 14T data. During the space period, a laser beam of reproducing power (bias power) is irradiated. In the space period, no pits are formed. When reproducing, the amount of return light is converted into an electrical signal in the segment photodetectors within the optical pickup 14 and is supplied to an RF signal processing section 22, and is then supplied to a decoder 24 for decoding, before being provided to the controller 20 as reproduction data.

The RF signal processing section 22, including an amplifier, an equalizer, a binarizing unit, a PLL or the like, boosts and then binarizes an RF signal to generate a synchronization clock which is then output to the decoder 24. A reproduction RF signal is also supplied to a pre-pit detection section 26.

The pre-pit detection section 26 detects a pre-pit signal component contained in the reproduction RF signal, which is formed in the land adjacent to the groove (in the land adjacent to the groove on the outer peripheral side), and supplies the detected pre-pit to the controller 20. The configuration of the pre-pit detection section 26 will be described in detail below.

The controller 20, which is constituted by a microcomputer or the like, supplies the recording data and also the detected pre-pit information to the encoder 18. The encoder 18 modulates the recording data and also supplies a data signal to the LD drive section 16 while periodically inserting synchronization information based into the detected pre-pit information.

Although servo systems for generating a focus error signal and a tracking error signal to control focus and tracking by means of a focus servo and a tracking servo are also provided, these are the same as the conventional drives and will not be described here.

Figure 2:
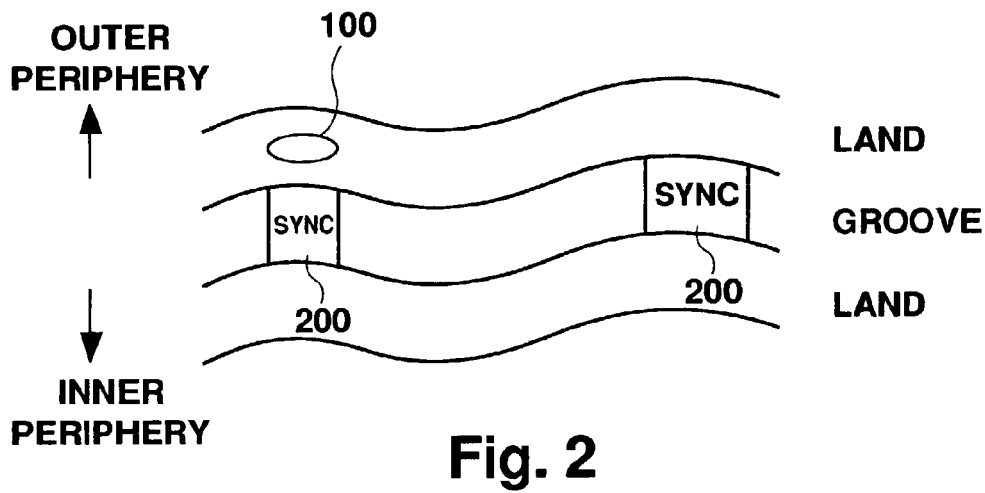
FIG. 2 is a view showing a relationship between groove and land, and a pre-pit of an optical disk.

FIG. 2 schematically shows a recording method of the optical disk 10 of this embodiment. As described above, the optical disk 10 includes pre-pits 100 formed in lands at the predetermined intervals. On the other hand, data to be recorded in the groove is previously divided into SYNC frames which are information units. 26 SYNC frames constitute one sector and 16 sectors constitute one ECC block. Synchronization information (SYNC) 200 for allowing synchronization among the SYNC frames is inserted in the leading portion of each SYNC frame. As the synchronization information SYNC, 14T data which is sufficiently longer than the longest 11T data appearing in the data modulation part is used so as to secure synchronization of the SYNC frames. Under the DVD-R standard, it is possible to select either mark or space SYNC pulse of 14T.

Referring to FIG. 2, the groove wobbles (winds) at predetermined frequencies. This is because the number of rotation of the optical disk 10 is detected by detecting the wobble frequencies.

Figure 3:
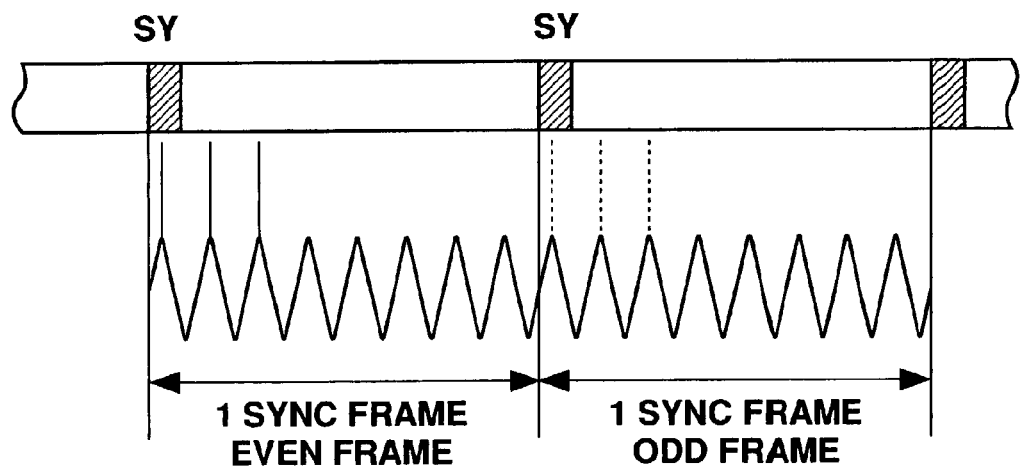
FIG. 3 is a view showing a relationship between a wobble signal and a pre-pit.

FIG. 3 schematically shows a relationship among the SYNC frame, the synchronization information (SY) and the pre-pit. The SYNC frames are roughly divided into even number frames (EVEN frames) and odd number frames (ODD frames), and pre-pits are typically formed corresponding to the EVEN frames. However, when the pre-pits are located at substantially the same position in lands adjacent to the groove to which data is to be recorded at both sides, two pre-pit components will be mixed in the return light. In such a case, the pre-pit is shifted to the ODD frame (see the dashed lines in the drawing) so as to eliminate such interference. Further, the wobble frequency is 8 times the SYNC frame frequency, and the pre-pit is coincident with the first three peaks of the wobbles in each SYNC frame, and the first pre-pit serves as a SYNC pre-pit indicative of the synchronization position. The optical disk device can detect the synchronization position by detecting this SYNC pre-pit in a reproduction signal, and 14T of the synchronization information (SYNC data) is allotted to this synchronization position to thereby record data.

Figure 4:
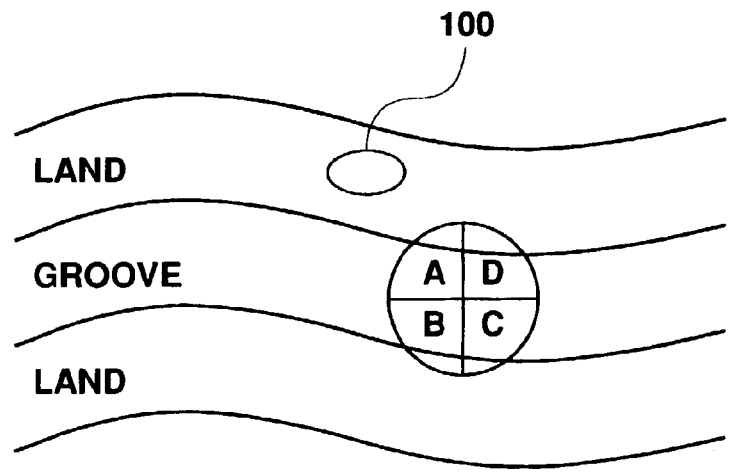
FIG. 4 is a view explaining an arrangement of four segment photodetectors.

FIG. 4 shows the arrangement of four segment photodetectors within the optical pickup 14 in relation to a laser spot. The four segment photodetectors comprise photodetectors which are in the radial direction of the optical disk 10 and photodetectors which are disposed in the circumferential direction of the optical disk 10. More specifically, the four segment photodetectors comprise photodetectors (A and D) and photodetectors (B and C) which are disposed in the radial direction of the optical disk 10. The four segment photodetectors also comprise photodetectors (A and B) and photodetectors (C and D) which are disposed in the circumferential direction of the optical disk 10. The photodetectors A and D are located toward the land in which the land pre-pit (LPP) 100 is formed.

Figure 5:
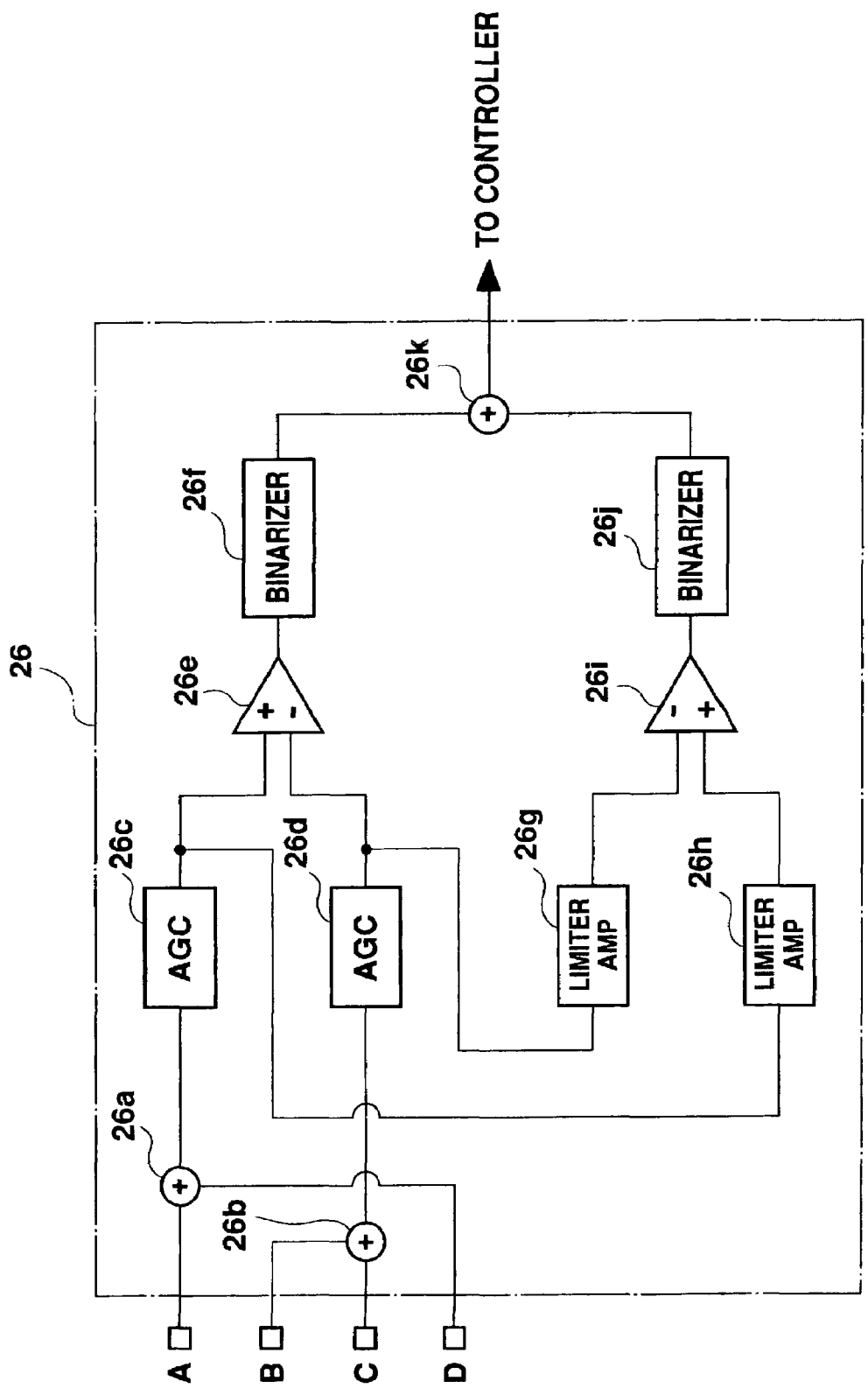
FIG. 5 is a diagram showing a configuration of a pre-pit detection circuit of FIG. 1.

FIG. 5 is a block diagram showing a configuration of the pre-pit detection section 26 in FIG. 1. The pre-pit detection section 26 comprises adders 26a, 26b, auto-gain controls (AGC) 26c, 26d, limiter amplifiers 26g, 26h, differential amplifiers 26e, 26i, binarizing units 26f, 26j, and a logical sum operator 26k.

Signals from the detectors A and D of the four segment photodetectors are supplied to the adder 26a, where the sum of the two signals is calculated, and the resultant signal (A+D) is supplied to the AGC 26c.

On the other hand, signals from the detectors B and C are supplied to the adder 26b, where the sum of the two signals is calculated, and the resultant signal (B+C) is supplied to the AGC 26d.

These signals (A+D) and (B+C) are subjected to gain control in the AGCs 26c and 26d, respectively, such that the levels of the signals substantially match, and are then supplied to the differential amplifier 26e. Specifically, the signal (A+D) is supplied to a non-inverted input terminal (+) and the signal (B+C) is supplied to an inverted input terminal (−) of the differential amplifier 26e.

The differential amplifier 26e calculates a difference between the two signals and supplies a signal (A+D)−(B+C) to the binarizing unit 26f.

The binarizing unit 26f binarizes the signal (A+D)−(B+C) supplied from the differential amplifier 26e with a predetermined threshold value to extract the pre-pit information, which is then supplied to the logical sum operator 26k. With the structure including the adders 26a, 26b, the AGCs 26c, 26e, the differential amplifier 26e, and the binarizing unit 26f, it is possible to extract the pre-pit signal during the mark period by appropriately adjusting the threshold value (to a degree at which noise can be removed during the mark period). However, it is difficult to extract the pre-pit signal during the space period for the reason already described. Namely, during the mark period, a laser beam of recording power is irradiated, and the noise level contained in the return light thereof is increased to a level equal to or greater than the level of the pre-pit signal during the space period.

Accordingly, the pre-pit detection section 26 of this embodiment further comprises limiter amplifiers 26g, 26h, a differential amplifier 26i, and a binarizing unit 26j, so as to detect the pre-pit information during the space period. The pre-pit information during the space period is then subjected to a logical sum operation with the pre-pit information during the mark period obtained from the binarizing unit 26f, so that pre-pit information during both the mark and space periods can be detected.

More specifically, the signal (A+D) signal, which is subjected to gain control and supplied from the AGC 26c, is supplied to the differential amplifier 26e and is also supplied to the limiter amplifier 26h. The limiter amplifier 26h limits the upper limit level of an input signal. Namely, when the upper limit value exceeds a predetermined upper limit value, the limiter amplifier 26h replaces the upper limit value with the predetermined upper limit value and supplies the signal (A+D) whose upper limit level is limited to the differential amplifier 26i.

On the other hand, the signal (B+C), which is subjected to gain control and is supplied from the AGC 26d, is supplied to the differential amplifier 26e and is also supplied to the limiter amplifier 26g. The limiter amplifier 26g, similar to the limiter amplifier 26h, limits the upper limit level of an input signal and supplies the signal (B+C) whose upper limit level is limited to the differential amplifier 26i.

The upper limit value of the limiter amplifiers 26h and 26g is greater by a fixed amount than the return light level during the space period and is smaller than the return light level of the recording power. Namely, the return light level of the recording power (the return light level B after formation of pits)>the upper limit>the return light level of the reproducing power. The upper limit values for the two limiter amplifiers 26g, 26h may be identical.

The differential amplifier 26i, which functions as an operator, calculates a difference between the two signals whose upper limit levels are limited, and outputs a signal (A+D)−(B+C) to the binarizing unit 26j. While the noise and the pre-pit signal of the mark period are removed in the limiter amplifiers 26g and 26h, the pre-pit signal of the space period is not limited by the limiter amplifiers 26g and 26h. Therefore, as a result of the difference calculation performed by the difference amplifier 26i, the modulation component of the recording power and the noise are removed, leaving only the pre-pit signal unremoved, so that the pre-pit signal of the space period can be reliably extracted in the binarizing unit 26j without being affected by the noise component during the mark period.

The logical sum operator 26k calculates a logical sum of the two input signals and supplies it to the controller 20. Since the binarizing unit 26f outputs the pre-pit signal of the mark period and the binarizing unit 26j outputs the pre-pit signal of the space period, both of the pre-pits signals of the mark and space periods are detected by calculating the logical sum of the two signals.

The above-described processing will be described in further detail using a timing chart.

Figures 6A, 6B, 6C, 6D:
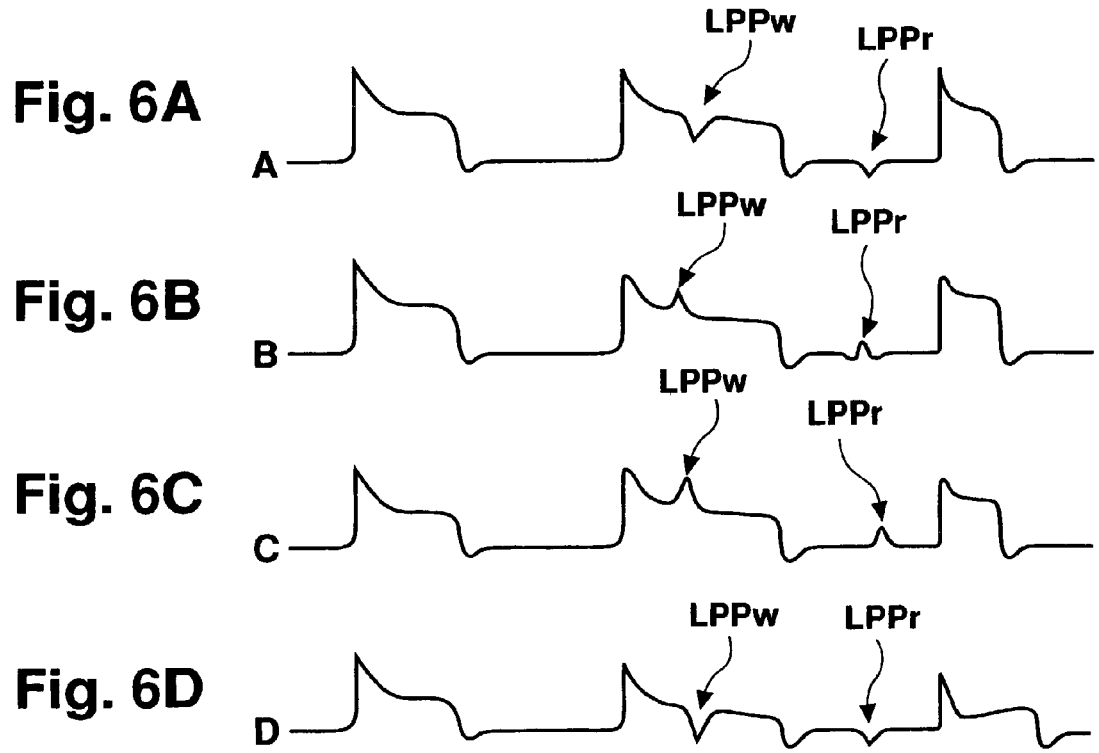
FIGS. 6A, 6B, 6C, and 6D are timing charts showing signals supplied from photodetectors A, B, C, and D, respectively of the four segment photodetectors.

FIGS. 6A to 6D show signals from photodetectors A to D, respectively. Specifically, FIG. 6A shows a signal from the photodetector A, FIG. 6B shows a signal from the photodetector B, FIG. 6C shows a signal from the photodetector C, and FIG. 6D shows a signal from the photodetector D. During the mark period, the laser power is increased to recording power, and therefore the signal level of the return light is also increased. Note that, although the recording pulse is actually a multi-pulse and therefore the return light signal thereof is also of a multi-pulse shape, in the drawings the envelope of the actual return light signal is shown for convenience of explanation. Immediately after irradiation of the recording power, as no pits are formed yet, the signal level of the return light is maximum (level A). With the formation of the pits, the level of the return light signal is decreased due to diffraction by the pits, and finally reaches a fixed value (level B). During the space period, on the other hand, as the laser beam of reproducing power is irradiated, the signal level of the return light thereof is fixed. When a pre-pit signal LPP exists during the mark period, since this LPP signal is contained in the return light signal, the level of the return light signal is decreased by an amount corresponding to diffraction by the LPP. This is also true during the space period. In the drawings, LPPw indicates an LPP component during the mark period, and LPPr indicates an LPP component during the space period. The LPP arbitrarily appears during either the mark period or the space period.

It should be noted that while in a signal from the photodetectors A and D located on the side of the land in which the pre-pit LPP is formed, LPPw and LPPr appear as a signal which decreases the signal level, they appear as a signal which increases the signal level (a signal with an inverted phase) in a signal from the photodetectors B and C.

FIGS. A and 7B show the signal (A+D) and the signal (B+C) which are subjected to gain adjustment in the AGCs 26c and 26d, respectively. FIG. 7C shows a signal (A+D)–(B+C) output from the differential amplifier 26e. It will be understood from the drawing that although the pre-pit LPPw during the mark period can be detected, it is difficult to detect the pre-pit LPPr during the space period because the level of the pre-pit LPPr is substantially the same as the noise level during the mark period.

Figure 8A:
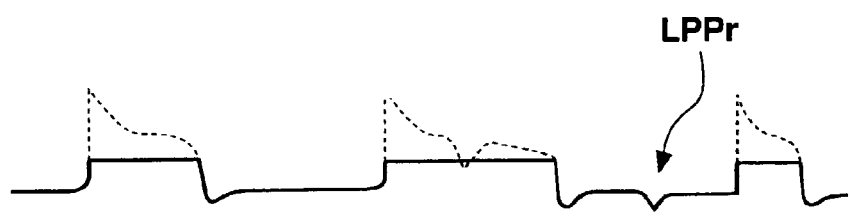
FIGS. 8A and 8B are timing charts showing signals output from limiters 26h and 26g of FIG. 5, respectively.
Figure 8B:
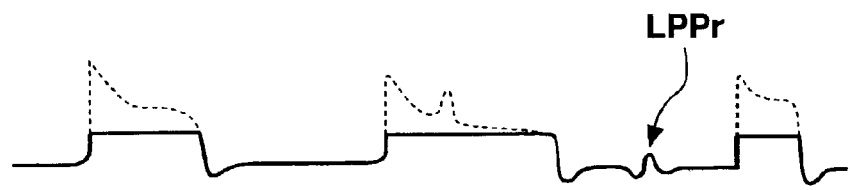

FIGS. 8A and 8B show a signal from the limiter 26h and a signal from the limiter 26g, respectively. The portions shown by a dashed line in the drawings are omitted because the upper limit level of the signal is limited to a fixed value by the limiter amplifiers 26h and 26g. Noise during the mark period is removed whereas LPPr during the space period remains. While LPPw during the mark period is removed similar to the noise, this would cause no problem because the LPPw is detected in the binarizing unit 26f.

FIGS. 9A and 9B show a signal from the differential amplifier 26i and a signal from the binarizing unit 26j, respectively. As a result of difference calculation between the two signals shown in FIGS. 8A and 8B, a component resulting from the recording power modulation and noise during the mark period are removed, and only LPPr during the space period remains. By binarizing this signal using a predetermined threshold value shown by a chain line in FIG. 9A, it is possible to reliably extract only the LPPr during the space period.

Figure 10:
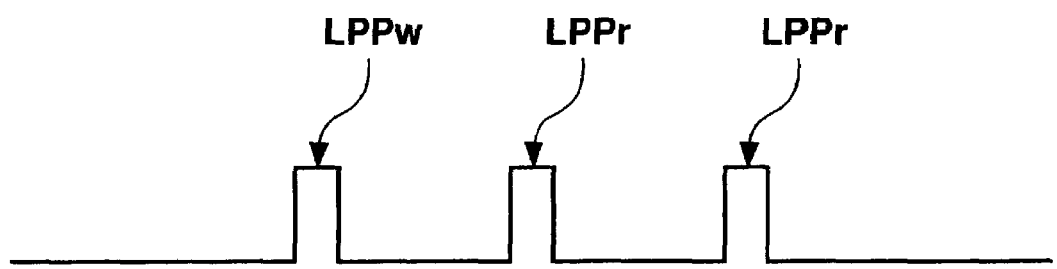
FIG. 10 is a timing chart showing a signal output from a logical sum operator 26k of FIG. 5.

FIG. 10 shows a signal which is supplied to the controller 20 from the logical sum operator 26k. Since the logical sum operator 26k outputs a logical sum of LPPw during the mark period supplied from the binarizing unit 26f and LPPr during the space period supplied from the binarizing unit 26j, the output signal includes a mixture of LPPw and LPPr as shown in FIG. 10. Accordingly, it is possible to reliably detect LPP regardless of whether the LPP exists during the mark period or the space period.

According to the this embodiment, rather than detecting LPP by, for example, sample-and-holding a return light signal in each of the mark and space periods, LPP during the space period can be detected simply by limiting the upper limit level of a signal. The circuit configuration can therefore be simplified.

While in the foregoing embodiment an example of DVD-R has been described, the present invention is similarly applicable to any other optical disk (such as DVD-RW) on which pre-pits are formed. In the case of a DVD-RW, since a laser beam of erasing power is irradiated during the space period, the upper limit value in the limiter amplifiers 26h and 26g is such that the level of return light of recording power>upper limit value>the level of return light of erasing power.

Further, in the foregoing example, it is also possible to provide a low-pass filter after the differential amplifier 26i so as to remove noise prior to binarization by the binarizing unit 26j.

Further, since LPP is coincident with the peaks of the wobble, namely LPP exists in synchronization with a wobble signal as shown in FIG. 3, it is possible to use the wobble signal, which is detected for controlling the number of rotation, to thereby set a gate, so that only LPPr in the vicinity of the peaks of wobble is extracted. Similarly, in the binarizing unit 26f, it is possible to use the wobble signal to set a gate for extracting LPPw.

In the foregoing example, the configuration in which one laser beam is irradiated to detect LPP has been described. It is possible, however, to detect LPP easily by using a plurality of laser beams rather than one laser beam. More specifically, the groove is irradiated with a main laser beam and the adjacent land on which LPP is formed is irradiated with a sub laser beam. LPP is detected using the sub laser beam. The main laser beam (main beam) and the sub laser beam (sub beam) are generated by splitting a laser beam from the laser diode into two beams using a grating. Here, it should be noted that, although a plurality of laser beams are also used in the known three beam method or DPP method, the intended use of the laser beams in these methods is to generate a tracking error signal, and not to detect LPP as in the present embodiment. Therefore, a processing method of the sub laser beam in this embodiment differs from the known method.

Although the basic configuration of this embodiment is substantially the same as the configuration shown in FIG. 1, in this embodiment the optical pickup 14 irradiates a groove which is an information recording track with a main laser beam and also irradiates an adjacent land on which the pre-pit information LPP concerning the groove is formed with a sub laser beam.

Further the optical pickup 14 comprises main four segment photodetectors for converting return light from the main laser beam into an electrical signal and sub four segment photodetectors for converting return light from the sub laser beam into an electrical signal. A signal output from the main four segment photodetectors is supplied to the RF signal processing section 22 and a signal output from the sub four segment photodetectors is supplied to the pre-pit detection section 26 through the RF signal processing section 22.

The pre-pit detection section 26 detects the pre-pit information based on four signals supplied from the sub four segment photodetectors and supplies the information to the controller 20.

Figure 11:
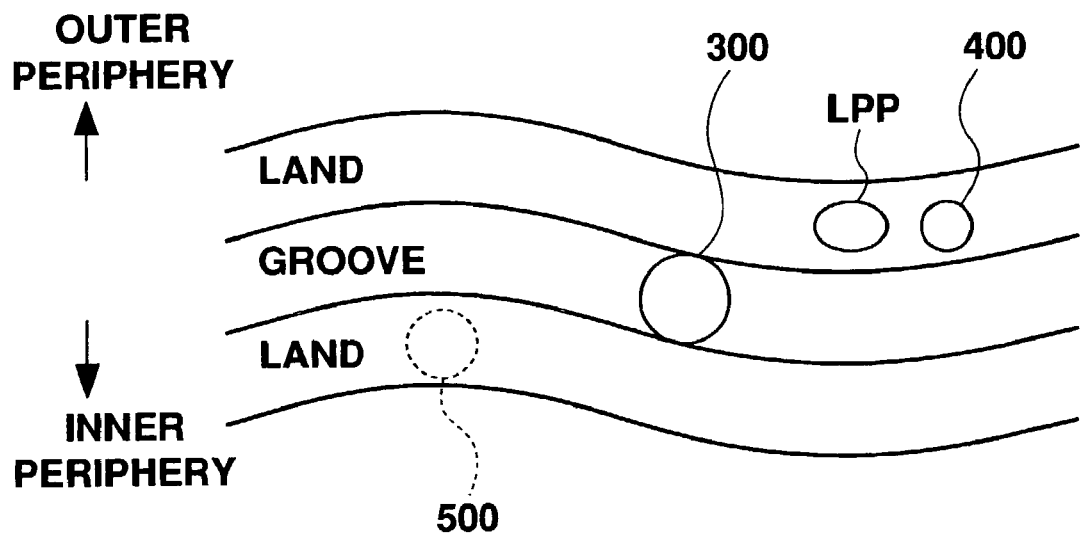
FIG. 11 is a view showing a positional relationship between a main laser beam and a sub laser beam.

FIG. 11 schematically shows a positional relationship between a laser beam irradiated onto the optical disk 10 from the optical pickup 14 and the groove and the land. The main laser beam 300 is irradiated from the optical pickup 14 onto the groove for recording and reproducing data. On the other hand, the sub laser beam 400 obtained by splitting the main laser beam 300 is irradiated onto substantially the center of the adjacent land on which the pre-pit (LPP) of this groove is formed. Namely, the main laser beam 300 and the sub laser beam 400 are disposed at an interval corresponding to a half of the track width. Further, while in the drawing the sub laser beam 400 is irradiated onto the land on the outer peripheral side because a pre-pit (LPP) is formed on the land located on the outer peripheral side, it is also possible to split the main laser beam 300 into three beams and the two lands adjacent to the groove on both sides are irradiated with two sub beams. FIG. 11 shows a sub laser beam 500 in such a case with a dashed line. However, a pre-pit (LPP) formed on the land located on the inner peripheral side concerns the groove located on the further inner peripheral side, and is therefore not used directly.

Figure 12A:
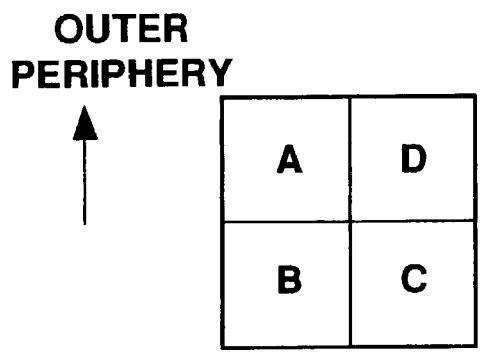
FIGS. 12A and 12B are views explaining arrangements of a main four segment photodetectors and sub four segment photodetectors, respectively.
Figure 12B:
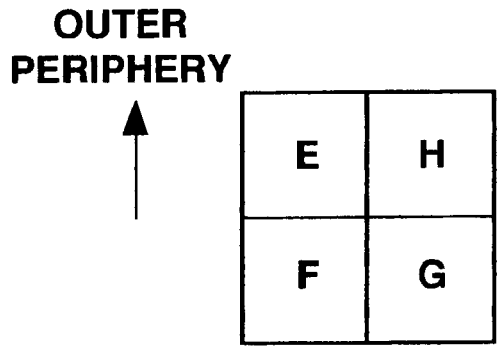

FIGS. 12A and 12B each shows a configuration of each of two sets of four segment photodetectors provided in the optical pickup 14. FIG. 12A shows a configuration of the main four segment photodetectors which are disposed in the radial direction and in the circumferential direction, to thereby form four segment photodetectors. The main four segment photodetectors include photodetectors A to D which are thus disposed. More specifically, the four segment photodetectors comprise two photodetectors (A and D) and two photodetectors (B and C), which are disposed in the radial direction of the optical disk 10. The four segment photodetectors also comprise two photodetectors (A and B) and two photodetectors (C and D), which are disposed in the circumferential direction of the optical disk 10. (See FIG. 4.) The return light of the main laser beam 300 enters the main four segment photodetectors.

FIG. 12B, on the other hand, shows a configuration of the sub four segment photodetectors which are disposed in the radial and circumferential directions, respectively, similar to the main four segment photodetectors. The sub four segment photodetectors include photodetectors E to H. More specifically, the sub four segment photodetectors comprise two photodetectors (E and H) and two photodetectors (F and G), which are disposed in the radial direction of the optical disk 10. The four segment photodetectors also comprise two photodetectors (G and H) and two photodetectors (E and F), which are disposed in the circumferential direction of the optical disk 10. The return light of the sub laser beam 400 enters the sub four segment photodetectors. It is assumed that in the sub four segment photodetectors, the photodetectors G and H are located upstream with regard to the rotation direction of the optical disk. Namely, a pre-pit is detected first by the photodetectors G and H, and is then detected by the photodetectors E and F.

Figure 13:
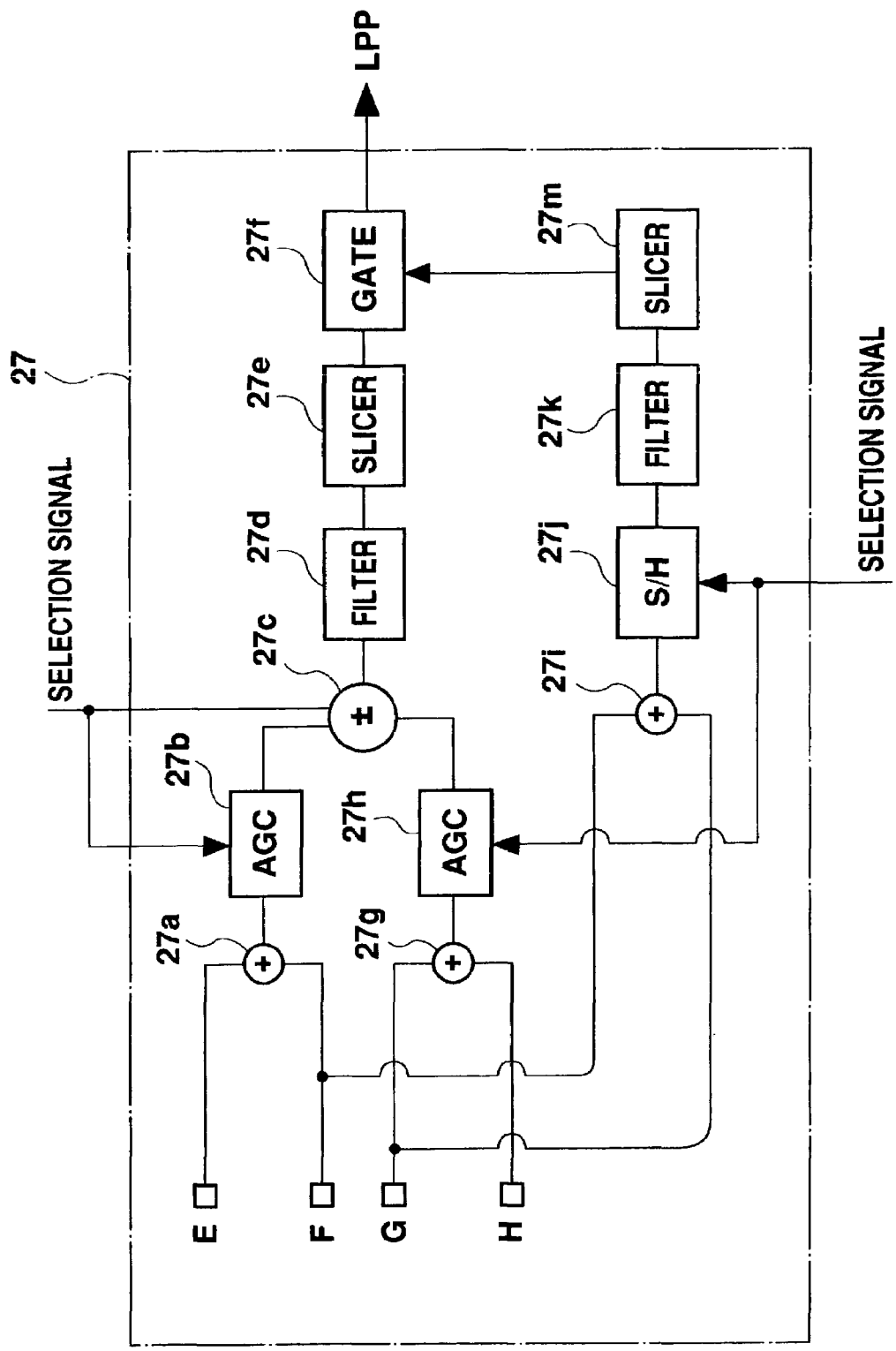
FIG. 13 is a diagram showing another configuration of the pre-pit detection circuit of FIG. 1.

FIG. 13 is a block diagram showing a configuration of the pre-pit detection section 26 according to this embodiment. The pre-pit detection section 26 comprises adders 27*a*, 27*g*, 27*i*, auto gain controls (AGCs) 27*b*, 27*h*, an adder/subtractor 27*c*, filters 27*d*, 27*k*, slicers 27*e*, 27*m*, a sample-and-hold (S/H) circuit 27*j*, and a gate circuit 27*f*.

The signals from the photodetectors E and F forming a part of the sub four segment photodetectors are added in the adder 27*a*, and the result is then supplied to the AGC 27*b*. Further, the signals from the photodetectors G and H forming another part of the sub four segment photodetectors are added in the adder 27*g*, and the result is then supplied to the AGC 27*h*. In each of the AGCs 27*b* and 27*h*, the gains of the two input signals are adjusted so as to match their levels, and the result is supplied to the adder/subtractor 27*c*. During reproduction, since the optical pickup 14 irradiates a laser beam of reproducing power and the sub laser beam 400 continuously has a fixed power, the levels of the signals supplied from the photodetectors E to H are substantially the same, which eliminates the need for special gain control in the AGCs 27*b* and 27*h*. Therefore, the operation of the AGCs 27*b* and 27*h* may be turned OFF during reproduction (especially when a sum of the two signals are calculated, as will be described later). More specifically, the operation of the AGCs 27*b* and 27*h* may be switched between ON and OFF based on a selection signal for recording and reproducing, which is supplied to the AGCs 27*b*, 27*h* from the controller 20. Each of the AGCs 27*b* and 27*h* supplies a signal subjected to gain adjustment to the adder/subtractor 27*c*.

The adder/subtractor 27*c* calculates a sum of or a difference between the signal (E+F) supplied from the AGC 27*b* and the signal (G+H) supplied from the AGC 27*h*, and supplies the calculated signal to the filter 27*d*. The adder/substractor 27*c* may calculate either a sum or a difference when reproducing, and calculates a difference when recording. The calculation of a sum or a difference may be switched based on the selection signal described above. In this embodiment, a case in which pre-pit information is detected during reproduction will be particularly described and the adder/subtractor 27*c* calculates a sum of the two signals.

The filter 27*d* smoothes the sum signal output from the adder/subtractor 27*c*, namely (E+F)+(G+H), and then supplies the result to the slicer 27*e*.

The slicer 27*e* extracts the upper level of the signal (E+F)+(G+H) at a predetermined threshold level, more specifically at a level which is greater than the base level by a predetermined amount, and then supplies it to the gate circuit 27*f*.

On the other hand, the signals output from the photodetectors F and G are also supplied to the adder 27*i*. The adder 27*i* adds the two signals to obtain a signal (F+G), and supplies the signal to the sample-and-hold (S/H) circuit 27*j*. The sample-and-hold circuit 27*j* samples-and-holds a signal at a timing when the laser beam has a reproducing power, and its function is not especially necessary when recording because the laser beam always has a reproducing power. The sample-and-hold circuit 27*j* can be switched between ON and OFF based on a selection signal. The sample-and-hold circuit 27*j* outputs the resultant signal (F+G) to the filter 27*k*.

The filter 27*k* smoothes the signal (F+G) and supplies the signal to the slicer 27*m*.

The slicer 27*m* extracts the upper and lower levels of the signal (F+G) at a predetermined threshold level, specifically at the zero level, and supplies the resultant signal to the gate circuit 27f. The photodetectors F and G are located on the groove side, and therefore the signal (F+G) contains a wobble signal of the groove. Accordingly, by slicing the upper and lower levels of this (F+G) signal, it is possible to detect peaks and troughs of the wobble signal.

The gate circuit 27f sets a process window based on the signal supplied from the slicer 27m. More specifically, the gate circuit 27f turns the gate ON at the peaks of the wobble single and turns the gate OFF to block the signal at timing other than the peaks of the wobble signal. As shown in FIG. 3, LPP is in synchronism with the wobble signal, and is formed so as to be coincident with the peaks of the wobble signal. Therefore, of the signals supplied from the slicer 27e, only a signal located at the peak of the wobble signal is extracted and supplied to the controller 20 as a pre-pit signal (LPP).

Figures 14A, 14B, 14C:
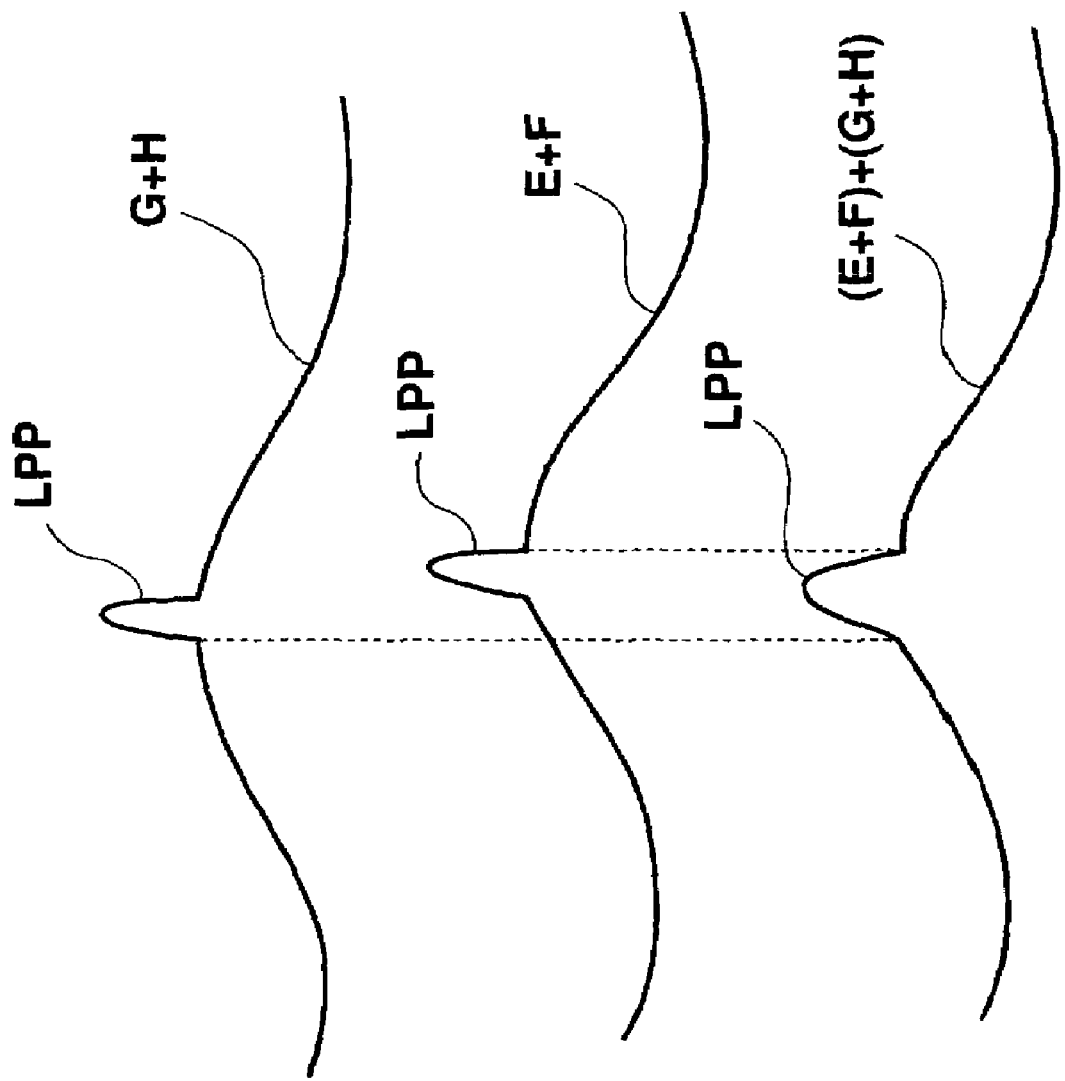
FIGS. 14A, 14B, and 14C are timing charts showing a signal (G+H), a signal (E+F), and a signal (E+F)+(G+H), respectively.

FIGS. 14A to 14C and FIGS. 15A to 15D show timing charts for the process described above. FIG. 14A shows an output from the adder 27g, namely the signal (G+H). A signal from the photodetectors G and H includes a wobble signal corresponding to the wobble of the groove, and LPP exists at the peak of this wobble signal. Although actually the amount of return light decreases at a portion where LPP exists because the laser beam is diffracted in this portion, in the drawing it is expressed as an inverted signal for the convenience of description.

FIG. 14B shows an output from the adder 27a, namely the signal (E+F). This signal also includes a wobble signal at the peak of which LPP exists. The two groups of photodetectors (E and F) and (G and H) which are divided in the circumferential direction are positioned upstream or downstream with regard to the pre-pit. Accordingly, as shown in FIGS. 14A and 14B, the LLP first appears in the signal (G+H), and then appears in the signal (E+F) with a delay of predetermined time. Consequently, by addition these two signals in the adder/subtractor 27c, LLPs contained in both signals are added, and a signal as shown in FIG. 14C is obtained. Since the actual signal includes various noise and the LPP level is relatively small, it is not easy to distinguish the LPP from the noise with regard to their levels.

FIG. 15A shows the signal (E+F)+(G+H) shown in FIG. 14C and indicates that the signal includes noise in addition to LLP.

FIG. 15B shows an output from the adder 27i, namely the signal (F+G), which is a wobble signal. Although LPP is actually included in this signal, it is not shown in FIG. 15B because the LPP will be sliced by the slicer 27m afterwards.

FIG. 15C shows a signal obtained by smoothing the signal from the adder 27i using the filter 27k and then slicing it using the slicer 27m, as a binary signal. Specifically, this binary signal is ON at the peaks of the wobble, and is OFF at troughs of the wobble. The gate circuit 27f processes the signal supplied from the slicer 27e based on this binary signal. More specifically, the gate is ON when the binary signal is ON and the gate is OFF when the binary signal is OFF. Thus, a signal is output only in the vicinity of the peaks of the wobble signal, so that only a signal located at the peak of the wobble signal is extracted as an original LPP and noise not located at the peak of the wobble signal is removed as noise.

As described above, during reproduction, the pre-pit information can be extracted based on the return light of the sub laser beam 400. However, the pre-pit information is detected at the location of the sub laser beam 400, and not at the location of the main laser beam 300. Therefore, when the controller 20 uses an algorithm for detecting the synchronization position and the address based on the pre-pit information detected by the main laser beam 300, it is necessary to delay the detected pre-pit information by a predetermined time. More specifically, a delay time is calculated from a spacing between the main laser beam 300 and the sub laser beam 400 in the circumferential direction (the rotational direction of the optical disk 10) and the linear velocity, and the detected pre-pit information is delayed using software within the controller 20, or is delayed using hardware by providing a delay circuit downstream of the pre-pit detection section 26. This makes it possible to perform processing as if the pre-pit is detected by the main laser beam 300.

Next, a case of detecting pre-pit information during the recording mode, namely when a laser beam of recording power is irradiated from the optical pickup 14, will be described.

FIGS. 16A to 16D show timing charts when recording. Referring to FIG. 13, based on a selection signal from the controller 20, the AGCs 27b and 27h and the sample-and-hold circuit 27j turn ON and the adder/subtractor 27c calculates a difference between the two input signals.

FIG. 16A shows a recording pulse, which is a multi-pulse. One data item is recorded with a series of multi-pulses. The pulse width of a front pulse, the duty of the subsequent pulse and the like are determined in accordance with a predetermined rule, so that signals of 4T to 14T are formed.

FIG. 16B shows the output from the adder 27g, namely the signal (G+H). Here, although a wobble component is not shown in the drawing for the convenience of description, in the actual signal, a wobble signal shown in FIG. 15A or 15B is superposed on the signal shown in FIG. 16B. As already described, for the return light of the main laser beam 300, the amount of return light is large at the beginning of the recording pulse because no pits are formed yet, and when the pits are formed, the amount of return light is decreased due to the diffraction, thereby representing a complicated signal change. LPP is included in part of such a signal change. For the return light of sub laser beam 400, however, as shown in FIG. 16B, only the modulation of the laser power due to the recording pulse appears without any influence of the pits, and LPP is included in this modulation.

FIG. 16C shows the output from the adder 27a, namely the signal (E+F), in which LPP appears with a delay of predetermined time Δt with regard to the (G+H) signal. The signal (E+F) and the signal (G+H) are subjected to gain control in the AGCs 27b and 27h, respectively, so as to make the levels thereof substantially the same, and then supplied to the adder/subtractor 27c which calculates a difference of the signals and outputs a signal (G+H)−(E+F). As a result of this difference calculation, the modulation component and the wobble component of the laser power are removed.

FIG. 16D shows an output from the adder/subtractor 27c, namely the signal (G+H)−(E+F), from which only LPP will be extracted. Thereafter, the gate circuit 27f turns the gate ON at the timing of the peaks of a wobble signal such that noise is reduced to extract only the original LPP, and the resultant signal is output to the controller 20. The sample-and-hold (S/H) circuit 27j samples the signal during the reproducing power (space period) and detects the peak position of the wobble signal without being affected by the modulation of the laser power. Further, the slicer 27e may extract either an upper or a lower portion of the signal, or may slice both the upper and lower portions so that it outputs the signal when both LPPs are detected and determines it to be noise and disregards it when only one LPP is detected.

Although in the above example, when recording data, sampling is performed at the reproducing power, namely during the space period in the sample-hold circuit, sampling may be performed at the recording power, namely during the mark period.

Further, although the pre-pit information is detected based on the return light of the sub laser beam 400 in the above example, it is also possible for the return light of the main laser beam 300 to also be used to detect the pre-pit information, and the one with a smaller error rate is used.

While the preferred embodiment of the present invention has been described using specific terms, such description is for illustrative purposes only, and it is to be understood that changes and variations may be made without departing from the spirit or scope of the appended claims.

What is claimed is:

1. An optical disk device for recording data by detecting pre-pit information formed on an optical disk, comprising:
   irradiation means for irradiating a laser beam onto the optical disk;
   detection means which is divided into at least two segments in the radial direction of the optical disk for detecting return light from the optical disk;
   adjustment means for performing adjustment such that electrical levels of two signals supplied from said detection means match;
   limitation means for limiting the electrical level of each of two signals supplied from said adjustment means;
   calculation means for calculating a difference between two signals supplied from said limitation means; and
   extraction means for extracting the pre-pit information contained in a signal output from said calculation means, wherein
   said irradiation means irradiates a laser beam of recording power and a laser beam of reproducing power or erasing power when recording data; and
   the limitation level of said limitation means is smaller than the level of return light when a laser beam of recording power is irradiated and is greater than the level of return light when a laser beam of reproducing power is irradiated.

2. An optical disk device according to claim 1, wherein said irradiation means irradiates a laser beam of recording power and a laser beam of reproducing power or erasing power when recording data; and
   said extraction means extracts pre-pit information when a laser beam of reproducing or erasing power is irradiated.

3. An optical disk device for recording data by detecting pre-pit information formed on an optical disk, comprising:
   irradiation means for irradiating a laser beam onto the optical disk;
   detection means which is divided into at least two segments in the radial direction of the optical disk for detecting return light from the optical disk;
   adjustment means for performing adjustment such that electrical levels of two signals supplied from said detection means match;
   limitation means for limiting the electrical level of each of two signals supplied from said adjustment means;
   calculation means for calculating a difference between two signals supplied from said limitation means; and
   extraction means for extracting the pre-pit information contained in a signal output from said calculation means, wherein
   said irradiation means irradiates a laser beam of recording power and a laser beam of reproducing power or erasing power when recording data, and
   the limitation level of said limitation means is determined so as to allow only the level of return light when a laser beam of reproducing power or erasing power is irradiated to pass through.

4. An optical disk device according to claim 3, wherein said extraction means includes means for binarizing a signal supplied from said calculation means with a predetermined threshold value.

5. An optical disk device for recording data by detecting pre-pit information formed on an optical disk, comprising:
   irradiation means for irradiating a laser beam onto the optical disk;
   detection means which is divided into at least two segments in the radial direction of the optical disk for detecting return light from the optical disk;
   adjustment means for performing adjustment such that electrical levels of two signals supplied from said detection means match;
   limitation means for limiting the electrical level of each of two signals supplied from said adjustment means;
   calculation means for calculating a difference between two signals supplied from said limitation means;
   extraction means for extracting the pre-pit information contained in a signal output from said calculation means;
   second calculation means for calculating a difference between two signals supplied from said adjustment means; and
   second extraction means for extracting the pre-pit information contained in a signal from said second calculation means.

6. An optical disk device according to claim 5, wherein said irradiation means irradiates a laser beam of recording power and a laser beam of reproducing or erasing power when recording data; and
   said second extraction means extracts pre-pit information when a laser beam of recording power is irradiated.

7. An optical disk device according to claim 5, wherein said second extraction means includes means for binarizing a signal supplied from said second calculation means with a predetermined threshold value.

8. An optical disk device according to claim 5, further comprising:
   means for synthesizing the pre-pit information extracted by said extraction means and the pre-pit information extracted by said second extraction means.

9. An optical disk device for recording data by detecting pre-pit information formed on an optical disk, comprising:
   an optical pickup for irradiating a laser beam of recording power during a mark period and irradiating a laser beam of reproducing or erasing power during a space period when recording data, and for receiving return light from the optical disk by photodetectors which are disposed in the radial direction of the optical disk and outputting signals;
   gain controllers for each adjusting gains of two signals supplied from said optical pickup;
   a calculator for calculating a difference between two signals supplied from said gain controllers;
   limiters for limiting levels of the two signals supplied from said gain controllers such that the upper limit level is between the level of return light of a laser beam of recording power and the level of return light of a laser beam of reproducing power;

a second calculator for calculating a difference between two signals supplied from said limiters;

a binarizer for binarizing a signal from said calculator with a first threshold value and extracting pre-pit information during said mark period;

a second binarizer for binarizing a signal from said second calculator with a second threshold value and extracting pre-pit information during said space period; and a circuit for calculating a logical sum of an output from said binarizer and an output from said second binarizer.

* * * * *